United States Patent
Mathew et al.

(10) Patent No.: US 10,417,158 B1
(45) Date of Patent: Sep. 17, 2019

(54) CHARGER ATTACH DETECTION

(71) Applicant: NXP B.V., Eindhoven (NL)

(72) Inventors: Anu Mathew, Chandler, AZ (US);
Abhijeet Chandrakant Kulkarni, Chandler, AZ (US); Siamak Delshadpour, Phoenix, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/183,729

(22) Filed: Nov. 7, 2018

(51) Int. Cl.
  *G06F 13/40* (2006.01)
  *G06F 13/42* (2006.01)
  *H02J 7/00* (2006.01)

(52) U.S. Cl.
  CPC ...... *G06F 13/4022* (2013.01); *G06F 13/4282* (2013.01); *H02J 7/007* (2013.01); *H02J 7/008* (2013.01); *G06F 2213/0042* (2013.01)

(58) Field of Classification Search
  CPC ....... H02J 7/007; H02J 7/008; G06F 13/4022; G06F 13/4282; G06F 2213/0042
  See application file for complete search history.

(56) References Cited

U.S. PATENT DOCUMENTS

| | | | | |
|---|---|---|---|---|
| 7,656,132 | B2 * | 2/2010 | So | H01M 10/44 320/134 |
| 9,184,606 | B2 * | 11/2015 | Demilato | H02J 7/0029 |
| 2007/0188134 | A1 * | 8/2007 | Hussain | H01M 10/44 320/114 |
| 2014/0207977 | A1 * | 7/2014 | Hang | G06F 13/385 710/16 |
| 2015/0180254 | A1 * | 6/2015 | Zhao | H02J 7/0052 320/107 |
| 2016/0043586 | A1 * | 2/2016 | Wang | H02J 7/0052 320/107 |
| 2016/0064977 | A1 * | 3/2016 | Chen | H02J 7/0052 320/114 |
| 2017/0277251 | A1 | 9/2017 | Gong | |
| 2018/0089123 | A1 | 3/2018 | Kulkarni et al. | |
| 2018/0267586 | A1 * | 9/2018 | Jung | G06F 1/263 |

* cited by examiner

*Primary Examiner* — Glenn A. Auve
(74) *Attorney, Agent, or Firm* — Rajeev Madnawat

(57) ABSTRACT

A circuit for detecting charger connection through a universal serial bus (UBS) connector is disclosed. The circuit includes a comparator having a first input coupled to a fixed voltage reference and a second input coupled to D+ pin of the USB connector, a voltage controlled current source (VCCS) coupled having a first terminal coupled to a supply and a second terminal coupled to the D+ pin and a resistor coupled between the first terminal and the second terminal of the VCCS. The VCCS is configured to bring voltage at the D+ pin within a preselected voltage range at the D+ pin when the voltage at the D+ pin varies beyond the preselected voltage range.

9 Claims, 2 Drawing Sheets

CHARGER ATTACH DETECTION

BACKGROUND

Universal Serial Bus (USB) protocol is typically used for data communication between two devices via a USB cable that includes VBUS, D+ and D− pins. VBUS is a power pin and D+/D− pins are used for data communication. However, these pins also enable a connected device to be charged or powered up. In a normal charging operation, the connected device acquires the charge from an adaptive charger via the VBUS pin. However, prior to power negotiations, the connected device needs to detect the absence or presence of a charger attached to the connected device. The standardized charging protocol ensures proper power navigation from the charger to the connected device. But an excessive disturbance in the ground plane of the charger can interfere with the detection of the connect/disconnect status of the charger by the connected device.

The native charger for a device often has a special signature on the data pins to let the connected device know it is safe to charge with more current. This signature may come in the form of a specific voltage placed on D+, or D−, or both. Therefore, a ground shift that interferes with an accurate measurement of voltage at these pins may prevent fast charging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a circuit for detecting charger connection through a universal serial bus (UBS) connector is disclosed. The circuit includes a comparator having a first input coupled to a fixed voltage reference and a second input coupled to D+ pin of the USB connector, a voltage controlled current source (VCCS) coupled having a first terminal coupled to a supply and a second terminal coupled to the D+ pin and a resistor coupled between the first terminal and the second terminal of the VCCS. The the VCCS is configured to bring voltage at the D+ pin within a preselected voltage range at the D+ pin when the voltage at the D+ pin varies beyond the preselected voltage range.

In some examples, the VCCS includes a first comparator and a second comparator. The first comparator includes a first input and a second input, the first input is coupled to an internal fix voltage reference and the second terminal is coupled to ground through a first resistor and a second resistor. The second comparator including a first input coupled to a junction of the first and second resistors and a second input coupled to a junction of a third and a fourth resistor. The first comparator drives a first switch and the second comparator drives a second switch. The second switch is coupled to the ground through the third and the fourth resistors. The circuit includes a third switch coupled to the D+ pin. The second and the third switches are driven by a same drive signal outputted by the second comparator.

In another embodiment, a method for detecting charger connection through a universal serial bus (UBS) connector is disclosed. The method includes measuring a voltage at a D+ pin of the USB connector and using a voltage controlled current source (VCCS) coupled to the D+ pin, generating current to increase the voltage at the D+ pin to a preselected voltage. The voltage at the D+ pin is then compared with a preselected fix voltage reference and a signal is generated to indicate a charger connection based on the comparing. The VCCS generates a current based on a voltage drop across a resistor that is coupled between a first terminal and a second terminal of the VCCS.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

In universal serial bus (USB) power delivery applications, mobile devices use USB connectors to perform battery charger operations. To maintain compatibility with the USB standards, mobile devices need to perform standard battery charging procedures (as specified in USB Standards BC 1.2, which is incorporated herein by reference), before initiating any charging protocol (e.g., fast charging protocol or FCP), when an adaptive USB charger is connected to a mobile device. Even though the power is transferred from the charger to the device via the VBUS pin of the USB connector, there are standardized charging protocols in place to identify and detect when a charging device is attached to the mobile device. For FCP, the detection protocols are determined by the expected voltage levels at the D+ pin of the USB connector. Any shift in the ground plane—either in the charger or at the mobile device, will degrade the detection level and may cause the mobile device to sense an incorrect charging status.

To sense the voltage level at the D+ pin, typically, the fast charging protocols (FCP) use pull-up and pull-down resistors connected to the D+ pin of the USB connector. This sensed voltage is compared against a fixed voltage reference (on the mobile device side and/or on the charger side). In a fast charging system environment, the ground plane of either the charger or the mobile device may become negative. This ground shift will reduce the threshold detection level of the USB D+ signal, forcing a fast charging comparator at the mobile device side to trigger to a wrong connection status signal.

Figure 1:
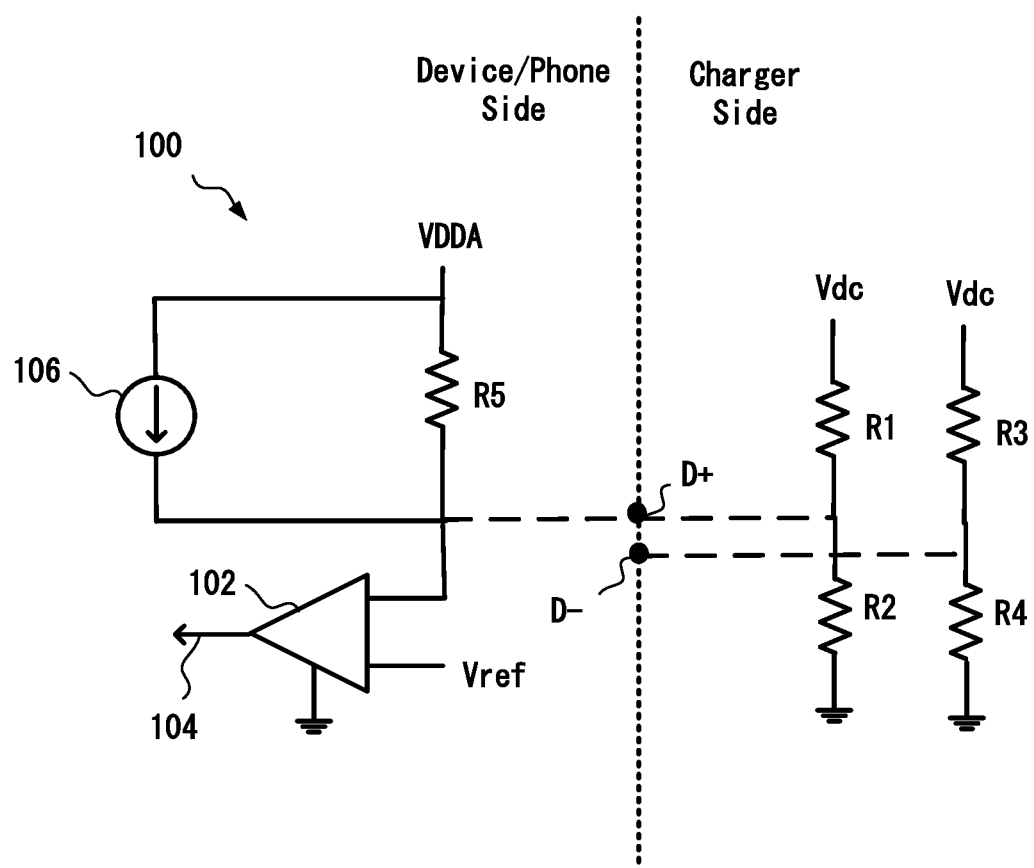
FIG. 1 shows a schematic of the relevant parts of a circuit for an improved detection of charger connection in accordance with one or more embodiments.

FIG. 1 shows a circuit 100 for an improved detection of charger connection when a device is connected to a charger via the USB connector that includes D+ and D− pins. On the charger side, the charger applies a constant voltage at D+ pin. In one example, the charger may use resistors $R_1$, $R_2$, $R_3$ and $R_4$ to produce constant voltages to be applied to D+ and D− pins. On the device side, when the device is connected to the charger, the device uses a comparator 102 to compare the voltage at the D+ pin with a fixed reference voltage $V_{ref}$ to determine if the USB cable is connected to a charger and produces a signal 104 accordingly at the output of the comparator 102. Upon determining via the signal 104 that the device is connected to the charger, the device may start charging its batteries or provide the power from the charger for the device's internal operations.

However, due to ground shift that may occur due to factors such a load mismatch, overload conditions, temperature change that may cause a drift in resistor values, etc., the ground voltage may become different from being 0 V. When the ground voltage changes, the voltage at D+ pin may also change. Note that even though the D+ pin is being referred to in this discussion, the same would also apply to the D− pin. If the voltage at the D+ pin varies beyond a threshold, the comparator 102 may provide an unreliable output signal 104 considering $V_{ref}$ remains the same.

The circuit 100 includes a voltage controlled current source (VCCS) 106. The VCCS 106 is a circuit that produces a current based on a voltage drop across a resistor $R_5$. On one end, the VCCS 106 is coupled to VDDA and on the other end the VCCS 106 is coupled to the D+ pin. When the voltage at the D+ pin varies due to factors such as the ground shifting, the voltage across the resistor $R_5$ also varies accordingly. This change in the voltage across the resistor $R_5$ causes the VCCS 106 to produce a current according to the changes in voltage across the resistor $R_5$. The current is applied to the D+ pin to bring the voltage at the D+ pin to a predetermined desired value.

Figure 3:
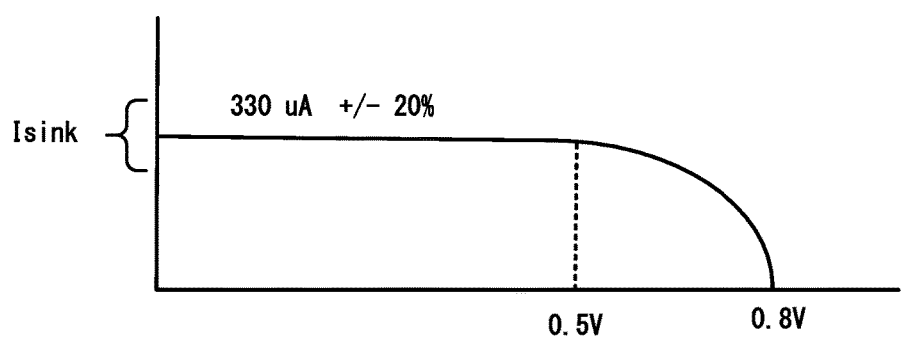
FIG. 3 shows a transfer characteristics curve for the VCCS of FIG. 2.

FIG. 3 shows the voltage to current characteristic of the VCCS 106. In this example, the voltage ranges from 0 to 0.5 V (i.e., the change in voltage drop across the resistor $R_5$), the VCCS 106 acts as a current source and from 0.5 to 0.7 V, the VCCS 106 acts as a linear resistor. $I_{sink}$ represents the current produced by the VCCS 106 to compensate for the change in the voltage at the D+ pin.

Moving back to FIG. 1 and applying Kirchhoff's current at the D+ pin, as follows:

$$(VDDA-V_C)/R_5 + I_{SINK} = (V_C - V_S)/R_2$$

Where $V_C$ is the voltage at the D+ pin, $V_S$ is a ground shift voltage and $I_{SINK}$ is the current generated by the VCCS 106. In some examples, the value of the resistor $R_5$ is calibrated such that when the voltage at D+ pin is within a preselected voltage range, $I_{SINK}$ is significantly zero.

The VCCS 106 acts as a constant current source from 0-0.5 V and from 0.5-0.7 V (the voltage across the resistor $R_5$), the VCCS 106 acts as liner resistor (e.g., a voltage controlled resistor or VCR). Because of this characteristic, any fluctuation in $V_C$ is compensated by the VCCS 106. In an example, if the voltage fluctuation is in the range of 0.6-0.7 V, as shown, the VCCS 106 operates in the voltage-controlled resistor mode. For example, if $V_S$ is shifted up by 100 mV (e.g., ground shift), this will cause current through the resistor $R_2$ will go down and will cause a lower $V_C$. In this condition, the VCCS 106 will output more current into the D+ pin to compensate the voltage drop at the D+ pin.

If $V_S$ has become more negative, the voltage $V_C$ will be reduced, but due to the voltage to current transfer characteristics of the VCCS 106, as shown in FIG. 3, the VCCS 106 will pump more current to keep the voltage $V_C$ from dropping further. Hence, the detection signal 104 indicating the connect status of the device from the charger is maintained.

In another example, if the value of the pull-down resistor $R_2$ at the charger is varied due to, for example, environmental causes (e.g., temperature changes), the voltage divider variations at the D+ pin will not affect the detection level because the VCCS 106 will be able to maintain a predetermined voltage at the D+ pin.

Figure 2:
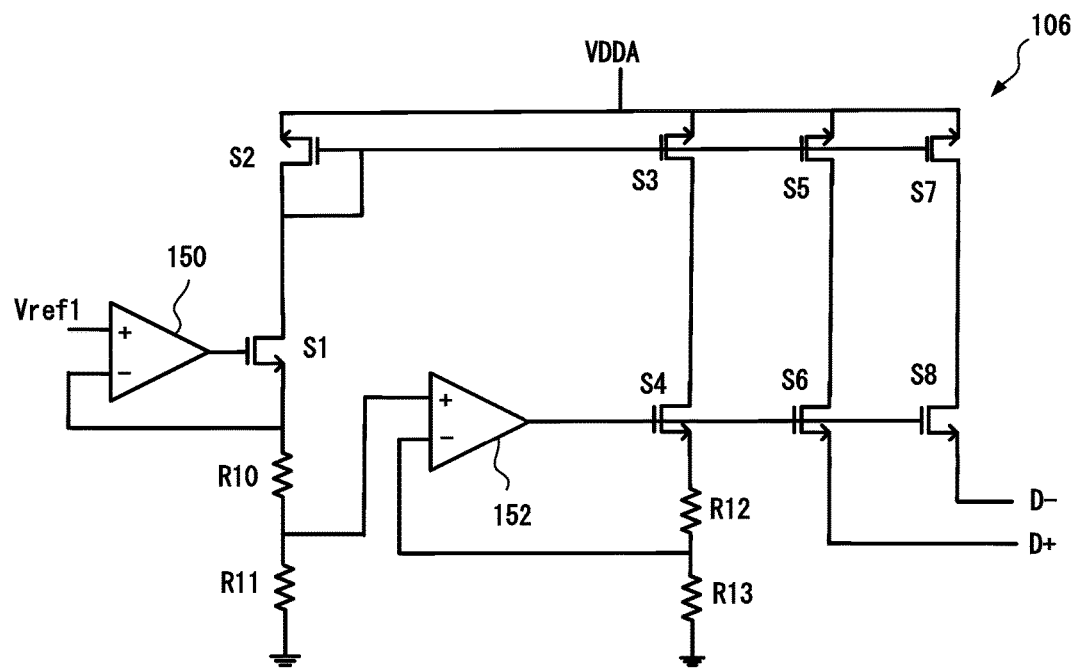
FIG. 2 shows a voltage controlled current source (VCCS) in accordance with one or more embodiments.

FIG. 2 depicts an exemplary circuit for the VCCS 106. The VCCS 106 includes a first comparator 150 coupled to an internal voltage reference $V_{ref1}$. In some examples, $V_{ref1}$ may have the same value as $V_{ref}$ in FIG. 1. In other examples, $V_{ref1}$ may have a different value than $V_{ref}$. The first comparator 150 may be coupled to resistors $R_{10}$ and $R_{11}$ and the output of the first comparator 150 may drive the switch S1. The resistors $R_{10}$ and $R_{11}$ are coupled together in series and the resister $R_{10}$ is coupled to the ground through the resistor $R_{11}$. The VCCS 106 also includes a second comparator 152 that is coupled to the junction of the resistors $R_{10}$ and $R_{11}$. The VCCS 106 further includes a switch S4 that is coupled to resistors $R_{12}$ and $R_{13}$. The resistor $R_{12}$ is coupled to the ground through the resistor $R_{13}$. The second comparator 152 is coupled to the junction of the resistors $R_{12}$ an $R_{13}$ and drives the switch S4.

The switch S1 is coupled to VDDA through another switch S2. The VCCS 106 further includes switches S3, S5 and S7. In one example, the gates of the switches S2, S3, S5 and S7 are driven by a same signal. The switches S2, S3, S5 and S7 are coupled to VDDA. A terminal of the switch S3 is coupled to a terminal of the switch S4. The VCCS 106 further includes switches S6 and S8. One terminal of the switch S6 is coupled to a terminal of the switch S5 while the other terminal of the switch S6 is coupled to the D+ pin of the USB connector. Similarly, one terminal of the switch S8 is coupled to a terminal of the switch S7 and the other terminal of the switch S8 is coupled to the D− pin of the USB connector. Switches S4, S6 and S8 may be driven by a same driver signal that is outputted by the second comparator 152.

As per Kirchhoff's current law, the current coming into a node should be equal to the current leaving a node. Therefore, any current variations caused by the resistor $R_5$ (for example, due to change in voltage across the resistor $R_5$ on the account of the change in voltage at the D+ pin) will be replenished at the D+ pin by the VCCS 106. Accordingly, when $V_C$ goes up, the VCCS 106 will source less current and when $V_C$ goes down the VCCS 106 will source more current.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A circuit for detecting charger connection through a universal serial bus (USB) connector, comprising:

a comparator having a first input coupled to a fixed voltage reference and a second input coupled to D+ pin of the USB connector;

a voltage controlled current source (VCCS) having a first terminal coupled to a supply and a second terminal coupled to the D+ pin; and a resistor coupled between the first terminal and the second terminal of the VCCS, wherein the VCCS is configured to bring voltage at the D+ pin within a preselected voltage range when the voltage at the D+ pin varies beyond the preselected voltage range.

2. The circuit of claim 1, wherein the VCCS includes a first comparator and a second comparator.

3. The circuit of claim 2, wherein the first comparator includes a first input and a second input, the first input is coupled to an internal fix voltage reference and the second terminal is coupled to ground through a first resistor and a second resistor.

4. The circuit of claim 3, wherein the second comparator including a first input coupled to a junction of the first and second resistors and a second input coupled to a junction of a third and a fourth resistor.

5. The circuit of claim 4, wherein the first comparator drives a first switch and the second comparator drives a second switch, wherein the second switch is coupled to the ground through the third and the fourth resistors.

6. The circuit of claim 4, further including a third switch coupled to the D+ pin, wherein the second and the third switches are driven by a same drive signal outputted by the second comparator.

7. A method for detecting charger connection through a universal serial bus (UBS) connector, the method comprises:

measuring a voltage at a D+ pin of the USB connector;

using a voltage controlled current source (VCCS) coupled to the D+ pin, generating current to increase the voltage at the D+ pin to a preselected voltage;

comparing the voltage at the D+ pin with a preselected fixed voltage reference; and generating a signal to indicate a charger connection based on the comparing.

8. The method of claim 7, wherein the VCCS generates a current based on a voltage drop across a resistor that is coupled between a first terminal and a second terminal of the VCCS.

9. The method of claim 8, wherein the resistor is further coupled between a supply terminal and the D+ pin.

* * * * *